US006360697B1

(12) United States Patent  (10) Patent No.: US 6,360,697 B1
Williams  (45) Date of Patent: Mar. 26, 2002

(54) PRESSURE PULSE PROBE FOR ANIMAL BEHAVIOR CORRECTION

(75) Inventor: Matthew R. Williams, Fort Wayne, IN (US)

(73) Assignee: Innotek, Inc., Garrett, IN (US)

(*) Notice: Subject to any disclaimer, the term of this patent is extended or adjusted under 35 U.S.C. 154(b) by 0 days.

(21) Appl. No.: 09/442,288

(22) Filed: Nov. 19, 1999

(51) Int. Cl.⁷ ................. A01K 15/02; A01K 29/00
(52) U.S. Cl. ........................... 119/720; 119/908
(58) Field of Search ................ 119/718–721, 792, 119/858, 859, 908

(56) References Cited

U.S. PATENT DOCUMENTS

| | | | | |
|---|---|---|---|---|
| 3,874,339 A | * | 4/1975 | Coulbourn | 119/792 |
| 5,099,797 A | * | 3/1992 | Gonda | 119/720 |
| 5,207,178 A | * | 5/1993 | McDade et al. | 119/859 |
| 5,533,469 A | * | 7/1996 | Touchton et al. | 119/721 |
| 5,559,498 A | * | 9/1996 | Westrick et al. | 340/573 |
| 5,606,116 A | * | 2/1997 | Yoneda et al. | 73/61.52 |
| 5,666,908 A | * | 9/1997 | So | 119/720 |
| 5,815,077 A | * | 9/1998 | Christiansen | 340/573.3 |
| 5,857,433 A | * | 1/1999 | Files | 119/720 |
| 5,911,198 A | * | 6/1999 | Curen et al. | 119/720 |

FOREIGN PATENT DOCUMENTS

| | | | | |
|---|---|---|---|---|
| FR | 2625646 | * | 7/1989 | 119/718 |
| FR | 2700665 | * | 7/1994 | A01K/15/02 |
| JP | 7297930 | * | 4/1997 | A01K/15/02 |

* cited by examiner

Primary Examiner—Peter M. Poon
Assistant Examiner—Son T. Nguyen
(74) Attorney, Agent, or Firm—Taylor & Aust, P.C.

(57) ABSTRACT

An animal control device directs a pressure pulse wave to an animal as a negative stimulus to deter undesired behavior. The animal control device includes a collar worn by an animal with a pressure pulse generator probe in contact with the animal's skin. The pressure pulse wave applied may be adjustable commensurate with the severity of undesired behavior. In one embodiment, the animal control device contains a remote transmitter for a trainer to administer a pressure pulse manually and at a desired intensity. In an alternate embodiment, the animal control device may contain a bark sensor to administer a pressure pulse when the animal produces undesirable barking. Alternatively, the animal control device may contain a sensor for directing a pressure pulse if an animal strays from a desired confined location.

13 Claims, 4 Drawing Sheets

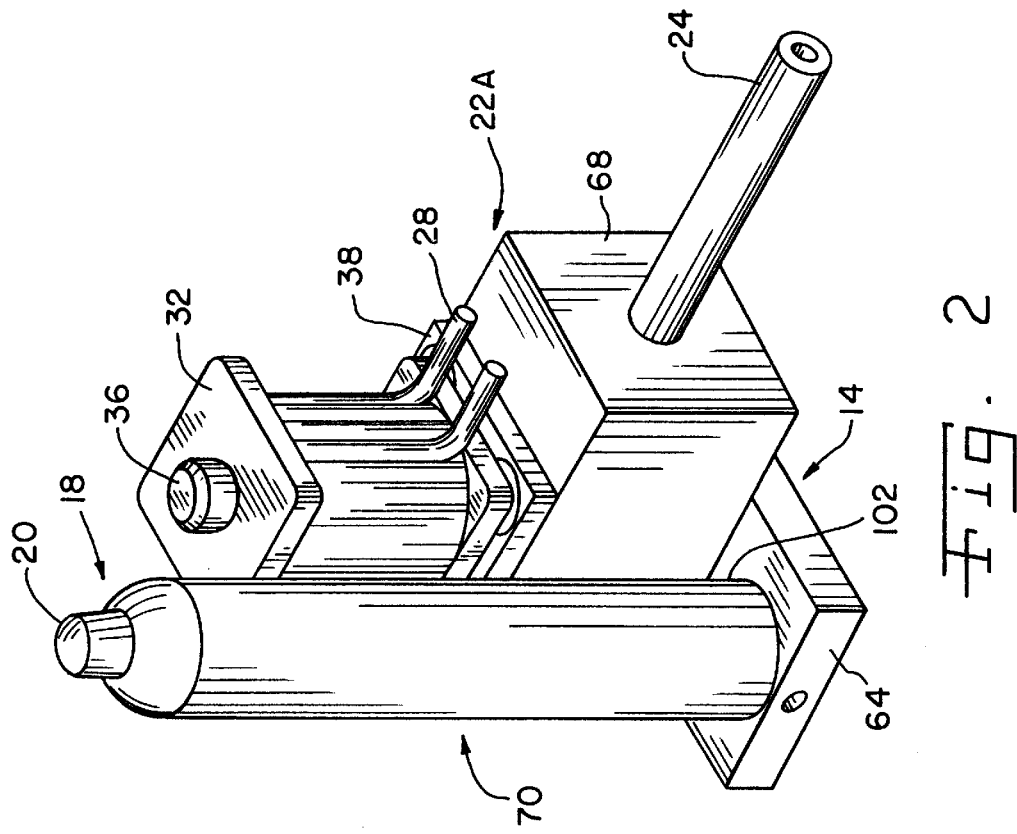
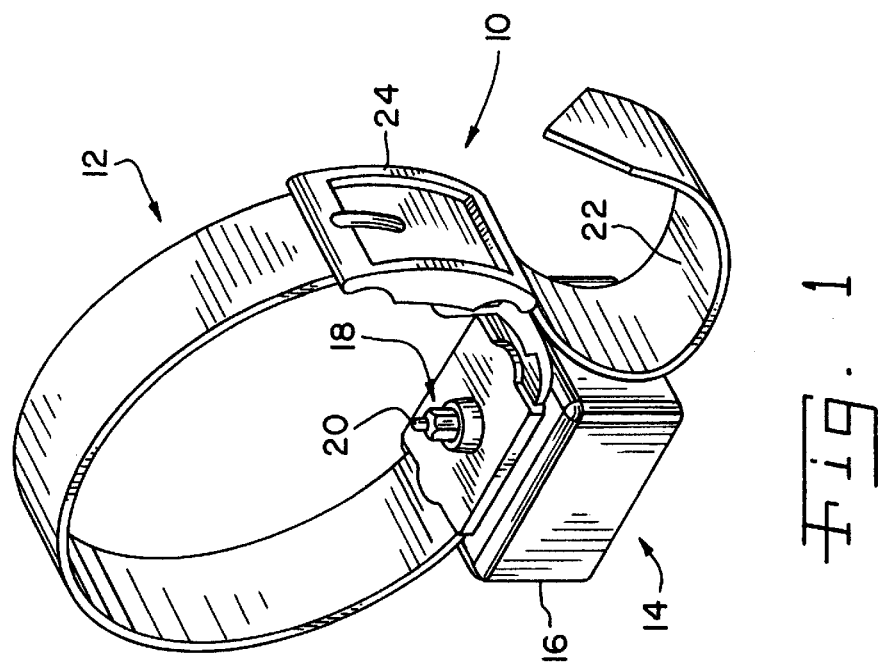

PRESSURE PULSE PROBE FOR ANIMAL BEHAVIOR CORRECTION

BACKGROUND OF THE INVENTION

1. Field of the Invention

The present invention relates to an animal control system and in particular, an animal control system which directs a pressure pulse wave to the skin of an animal for curbing undesirable animal behavior.

2. Description of the Related Art

Animal trainers as well as animal owners often have to administer a negative stimulus (i.e., correction) to an animal being trained to reinforce the correction of undesirable behavior. In order for the negative reinforcement to be effective, the negative stimulus must invoke a sensation of discomfort sufficient to discourage the animal from repeating the undesired behavior. It is advantageous to have the negative stimulus be administered in a humane and safe fashion. In addition, it is desirable that the negative stimulus not irritate nor jeopardize the welfare of the trainer.

Current systems of negative stimulus include spanking the animal with a rolled up newspaper, generating offensive smells or sounds, and applying electric shock. Use of electric shock has attained a great degree of success towards meeting the goals of an ideal negative stimulus system. Electric correction systems provide a convenient use and allow a trainer to select a level of correction stimulus. However, certain individuals may not wish to apply an electrical stimulus to their pet.

What is needed in the art is an animal correction system that does not irritate the trainer, that is humane, and provides a level of discomfort that is adjustable commensurate with the severity of undesirable behavior.

SUMMARY OF THE INVENTION

The present invention provides an animal control device which directs a pressure pulse wave to the skin of an animal as a technique for correcting undesirable animal behavior.

The invention comprises, in one form thereof, an animal control device adapted to be in contact with the skin of an animal which produces a pressure pulse. The animal control device comprises a collar and a pressure pulse generator for producing a pressure pulse. A controller is operatively associated with the pressure pulse generator for selectively generating the pressure pulse. In one particular further embodiment, the animal control device comprises a receiver operatively associated with a controller. In yet a further embodiment, a transmitter is operatively associated with the controller.

The invention in another embodiment thereof is a method of providing animal control. The method comprises applying a pressure pulse wave generating collar to an animal. The animal is monitored and undesirable behavior is identified. A pressure pulse wave is directed to the animal when undesirable behavior is detected.

An advantage of the present invention is that a humane negative stimulus may be administered to an animal to deter undesirable behavior. Through the use of a pressure pulse wave, a negative stimulus is applied to the skin of an animal for the correction of undesirable behavior.

Another advantage of the present invention is that the intensity of negative stimulus may be controlled.

Yet another advantage of the present invention is the ease of use of the animal control device.

An additional advantage of the present invention is an animal control device which can operate automatically, i.e., without human intervention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a perspective view of an animal control device according to an embodiment of the present invention.

FIG. 2 is a perspective view of the pressure pulse generator;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 3:
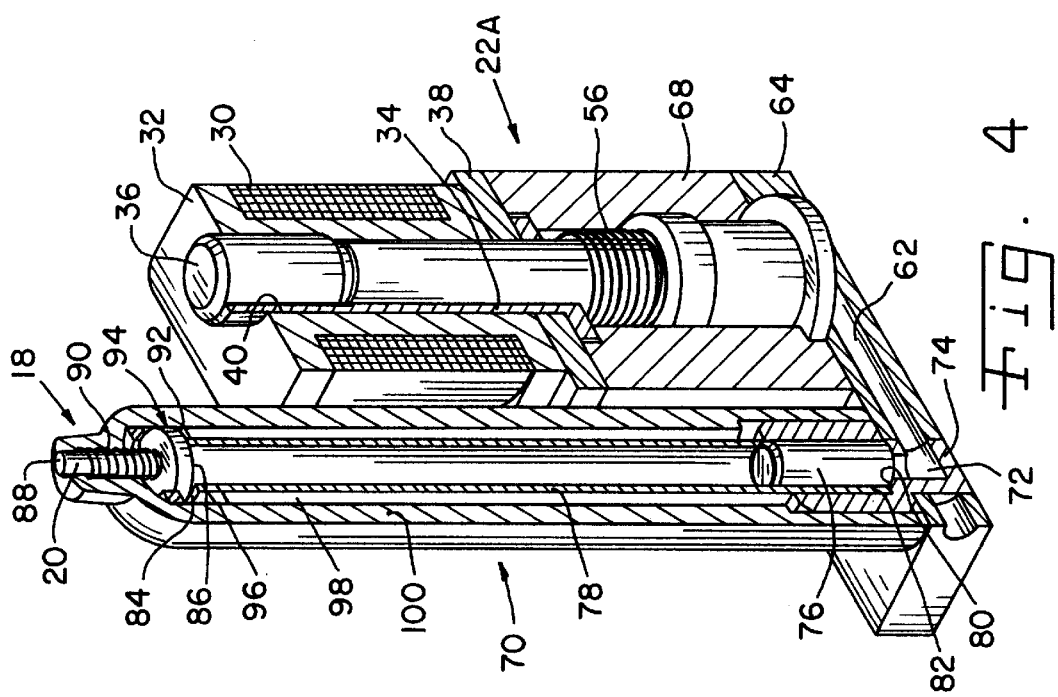
FIG. 3 is a partial cross-sectional perspective view of the pressure pulse generator of FIG. 1.

Referring now to the drawings and in particular to FIG. 1, there is shown an embodiment of an animal control device 10 of the present invention. Animal control device includes collar 12 and pressure pulse generator 14. Pressure pulse generator 14 includes enclosure 16 which houses the mechanism by which the pressure pulse generator 14 produces a pressure pulse wave. Extending radially inward from enclosure 16 is probe 18 having tip 20. Collar 12 is adapted to fit around an animal's neck. Collar 12 includes an adjustable strap 22 with buckle 24 permitting collar 12 to accommodate the varying sizes of necks of different animals. Collar 12 is adjustable to permit tip 20 to be in contact with the skin of an animal's throat when collar 12 is securely fastened around the animal's neck. During operation of animal control device 10, a compression wave is generated within probe 18 and proceeds along tip 20. The compression wave leaves tip as a pressure pulse wave is applied to the skin of the animal.

Referring now to FIG. 2, pressure pulse generator 14 is an electronically controlled, pneumatically powered device. Pressure pulse generator 14 comprises probe 18, tip 20 and valve 22A. In addition, pressure pulse generator 14 contains a battery, gas cylinder, and a pressure regulator (not shown). The battery, gas cylinder and pressure regulator may be any standard commercial design. The gas cylinder and pressure regulator provide a gas flow at a constant pressure.

Referring now to FIG. 3, gas flow at a constant regulated pressure enters the inlet side of valve 22A through inlet tube 24. Solenoid 26 includes input leads 28 attached to windings 30. Windings 30 encircle bobbin 32 which surrounds sleeve 34 and adjustment slug 36. Bobbin 32 and sleeve 34 are constructed of a non-ferrous material. Sleeve 34 is retained by cover plate 38. The outer diameter of slug 36 may be threaded to mate with sleeve end 40 so that rotation of adjustment slug 36 causes a proportional translation of slug 36 within sleeve 34. Alternatively, adjustment slug 36 may be adhesively bound or press fit onto sleeve 34.

Stem 42 is disposed within sleeve 34 and reciprocates within sleeve 34. Gap 44 is maintained between bottom face 46 of adjustment slug 36 and top face 48 of stem 42. Adjustment slug 36 and stem 42 are constructed of a magnetizable material.

Longitudinally opposite slug 36, stem 42 is enlarged from a boss 50 with recess 52 which retains an elastomeric disk 54. Compression spring 56 applies a biasing force against stem 42 to press elastomeric disk 54 tightly against tubular boss face 57 of orifice plate 58. Orifice plate 58 includes orifice plate bore 60 which runs through orifice plate 58 and is aligned with manifold bore 62 and manifold plate 64. Gas flow from a pressure regulator (not shown) enters valve 22A through tube 24 which is captured in housing bore 66 of housing 68.

Figure 4:
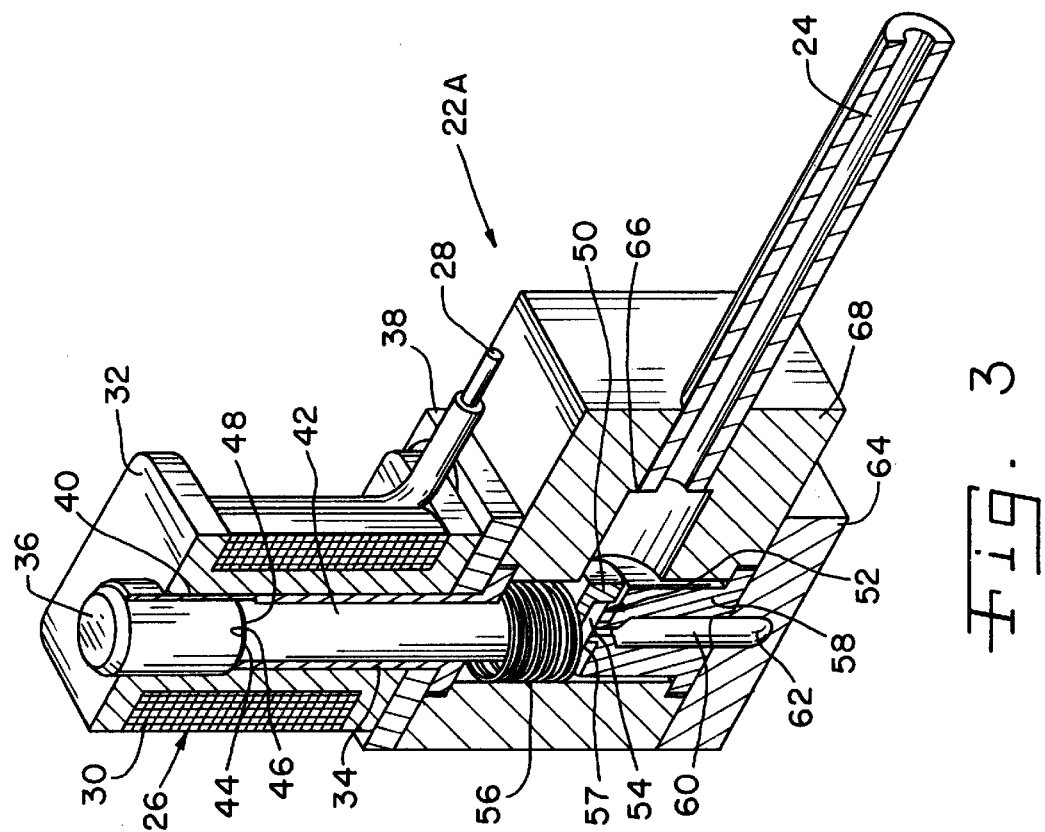
FIG. 4 is a view orthogonal to that of FIG. 2, shown in partial cross-section of the pressure pulse generator of FIG. 1 prior to the movement of the impactor.
Figure 5:
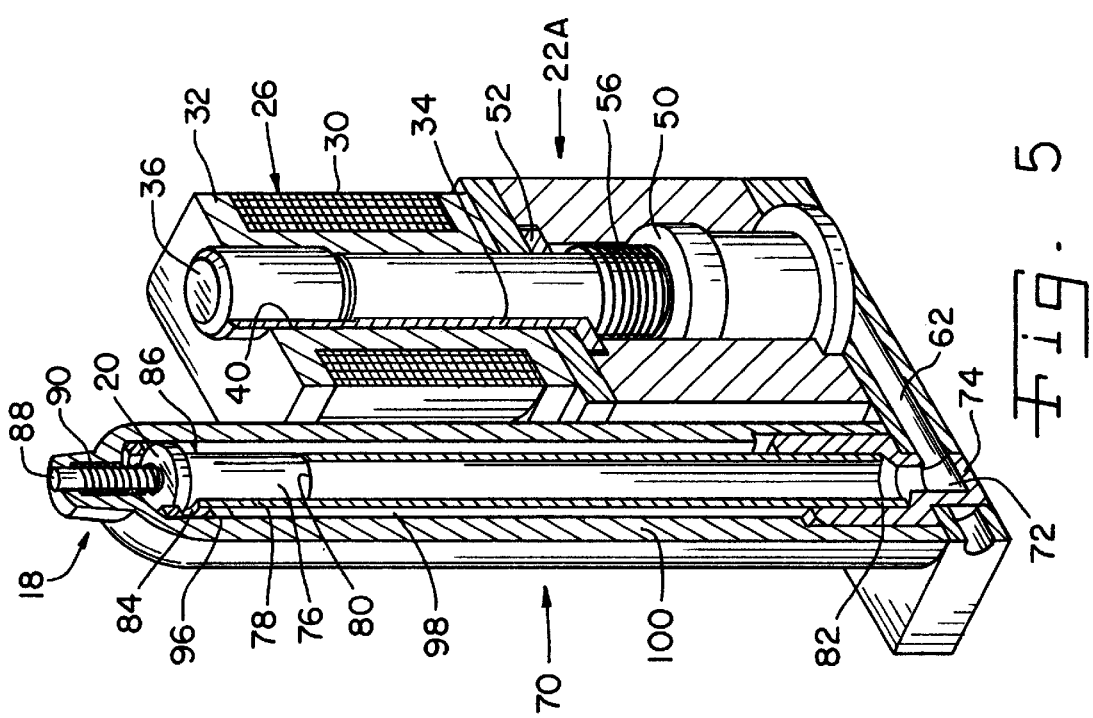
FIG. 5 is the pressure pulse generator of FIG. 3 shown with the impactor in its superior position adjacent in the tip.

Referring to FIGS. 4 and 5, gas flow enters pressure wave generator 70 from manifold bore 62 through coupling bore 72 of coupling 74. Pressure wave generator 70 includes impactor 76 which translates freely within guide tube 78. FIG. 4 depicts pressure pulse generator 70 prior to activation with impactor 76 disposed in guide tube 78 adjacent coupling bore 72. FIG. 5 depicts the pressure pulse generator 70 when a pressure pulse wave is generated. During pressure pulse wave generation, impactor 76 traverse guide tube 78 from its initial position adjacent coupling bore 72 (FIG. 4) to its final position against tip 20 (FIG. 5).

The pressure of gas within guide tube 78 acts against bottom impactor surface 80. As a result of the gas pressure, a force is applied upon impactor bottom surface 80 which accelerates impactor 76 upward within guide tube 78. The outer diameter of impactor 76 is chosen to be slightly smaller than the inner diameter of guide tube 78 so that the impactor 76 translates freely within guide tube 78 while providing a minimal gas leakage between impactor 76 and guide tube 78. Impactor 76 attains kinetic energy as it transverse the guide tube 76 from coupling end 82 towards distal end 84 where the impactor strikes tip bottom surface 86 of tip 20.

Tip end face 88 is in contact with the skin of the animal when the animal control device is properly secured to an animal's neck. The surface area of tip end face 88 is a relevant parameter effecting the performance of probe 18. Surface diameters ranging from 1/64 to 3/16, preferably between 3/64 to 3/32 of an inch were found to provide optimal results. As the surface area was reduced below 3/64, possible skin irritation could occur. As the tip surface diameter was increased beyond 3/32, it became difficult to impart sufficient kinetic energy to the impactor to result in an applied pressure pulse of sufficient amplitude to provide adequate discomfort to the animal to discourage difficult to correct behavior such as chasing prey or attacking other animals.

Tip 20 is free to translate within probe 18. Probe compression spring 90 applies a biasing force against tip 20 to hold tip 20 against ledge 92 of tip bore 94. When gas pressure is not applied to impactor 76, tip 20 is retracted within tip bore 94. Outlet 96 allows gas flow from guide tube 78 to exit the pressure wave generator 70 through outlet cavity 98 located between guide tube 78 and pressure wave generator wall 100.

Figure 6:
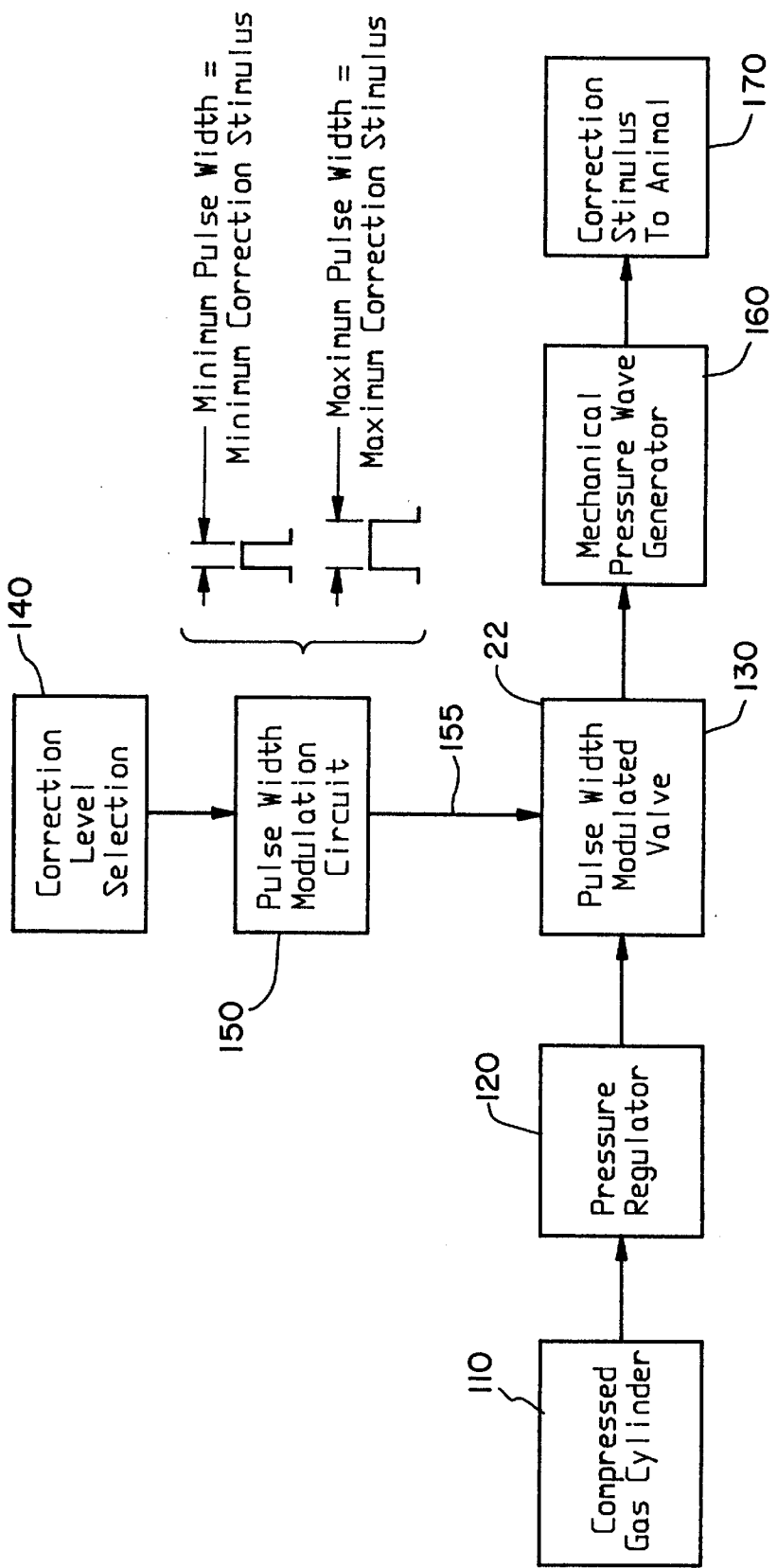
FIG. 6 is a diagram depicting the interrelationship of the components of an animal control device according to the present invention.

Referring now to FIG. 6, during the operation of animal control device 10, constant gas pressure is supplied by compressed gas cylinder 110 through pressure regulator 120 to valve 22A An operator uses the correction level selector 140 to adjust the level of correction in terms of the amplitude (i.e., the intensity) of pressure pulse to be generated. A consistent or constant gas pressure is supplied to valve 22A prior to valve 22A opening.

Pressure pulse width modulation circuit 150 directs current flow via line 155 to solenoid valve 22A. Mechanical pressure pulse generator 70 produces a pressure pulse wave correction stimulus (block 170) having a pulse width corresponding to the correction level selected. The correction stimulus is directed to an animal in the form of a negative stimulus to curb undesired behavior.

Specifically, during operation of the animal control device, a pressure pulse wave of desired width is produced when direct current flows in windings 30 of solenoid 26 (FIG. 3). The current flow creates a magnetic field which magnetizes adjustment slug 36 and stem 42. Slug 36 and stem 42 attract one another and stem 42 is pulled towards the stationary adjustment slug 36, thereby closing gap 44 between slug 36 and stem 42. As stem 42 translates towards slug 36, disk 54 is pulled away from orifice plate 58 thereby allowing pressurized gas to flow from the compressed gas cylinder (not shown) and pressure regulator (not shown) through tube 24 and housing bore 66 through orifice bore 60 and on to manifold bore 62.

The gas flow enters pressure wave generator 70 where the expanding gas imparts kinetic energy to the impactor 76 as the impactor is propelled in guide tube 78 toward tip bottom surface 86 (FIGS. 4 and 5). Gas in guide tube 78 is expelled out through outlet 96, down through outlet cavity 98, and out vent 102 (FIG. 2).

Impactor 76 continues transversing guide tube 78 until impactor 76 strikes tip bottom surface 86 (FIG. 5). A mechanical compression wave is generated as a result of impactor 76 striking tip bottom surface 86. The mechanical compression wave travels along tip 20 from tip bottom surface 86 to tip end 88. The action of the compression wave traveling through tip 20 causes a slight upward (i.e., radially inward relative to collar 12) displacement of tip 20 thereby compressing probe compression spring 90.

When the tip end 88 contacts with an animal's skin, the compression wave leaves the tip 20 as a pressure wave pulse that enters the animal's skin. The pressure wave pulse excites local neurons within the animal's neck. The excitation of local neurons provides a mode of stimulus to an animal to effect correction of an animal's undesired behavior.

When all of the kinetic energy produced in impactor 76 as impactor 76 traverses guide tube 70 has been transferred to tip 20, probe compression spring 90 returns tip 20 to its pre-impact position. Impactor 76 is pushed by the action of tip 20 returning to its initial position and impactor 76 continues to travel away from tip 20 under the influence of the push from tip 20 moving to its initial position.

The intensity of the pressure wave pulse is related to the volume of gas supplied behind impactor 76. Therefore, it is possible to adjust the intensity of the pressure wave pulse applied to an animal by varying the volume of gas supplied behind impactor 76. The volume of gas supplied behind impactor 76 is determined by the length of time solenoid valve 22A is open. The length of time solenoid valve 22A is open is controlled by the length of time a current flow is supplied to solenoid windings 30. The length of time current flow is supplied to windings 30 is operator selectable via correction level selector 140 operatively associated with pulse width modulation circuit 150 (FIG. 6).

The animal control device may be selected to apply a pressure pulse from a maximum pressure wave pulse to a minimum pressure wave pulse. A maximum pressure wave pulse is produced when current flow is supplied to solenoid 22A at a maximum duration. The maximum duration is the length of time sufficient to allow a volume of gas to be introduced behind impactor 76 such that the pressure of the gas remains constant as impactor 76 completely transverses guide tube 78 and strikes tip 20. As the current flow duration decreases from its maximum, the volume of gas introduced behind the impactor becomes insufficient to maintain a constant pressure as impactor 76 moves along guide tube towards tip 18 and the volume behind the impactor increases. The increase in volume behind impactor 76 results in a proportional decrease in gas pressure as impactor 76 transverses in guide tube 78. The resulting force applied by the expanding gas behind impactor 76 similarly decreases with an associated reduction in impactor 76 velocity and kinetic energy at the instant of impact of impactor 76 with tip 20. A lower amplitude compression wave is propagated through the tip 20 with an associated reduction in amplitude of pressure wave pulse applied to an animal's skin. Successive reductions in current flow duration result in proportional reduction in the correction stimulus level.

Figure 7:
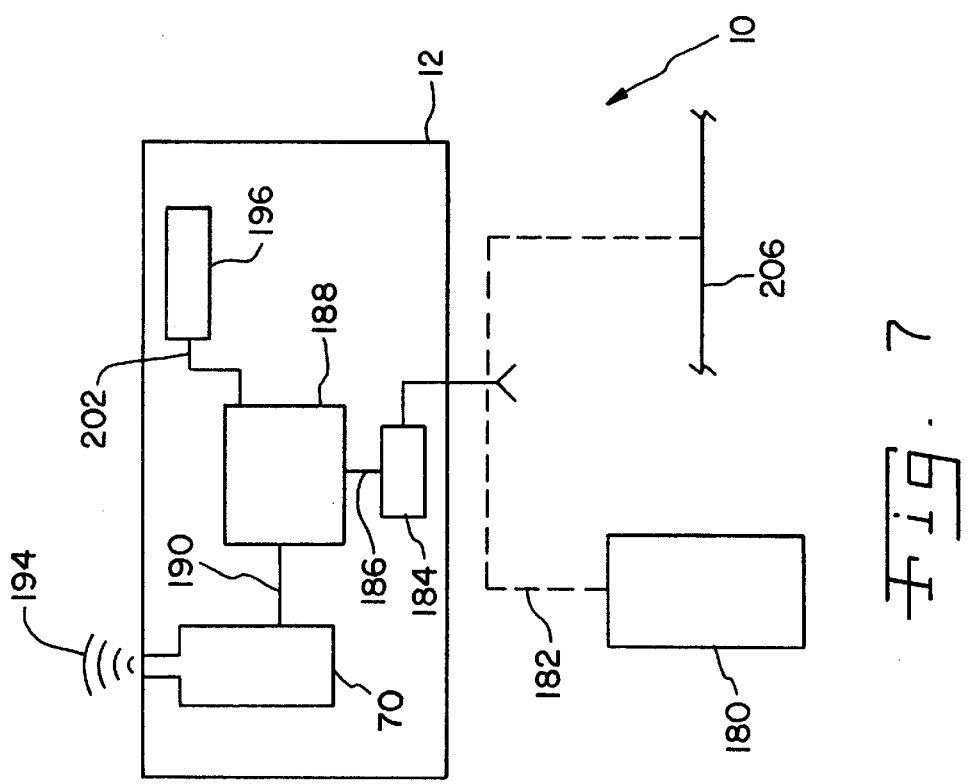
FIG. 7 is a diagrammatic view of an animal control device according to an embodiment of the present invention.

FIG. 7 depicts a diagrammatic view of one particular embodiment of animal control device 10. Hand held remote 180 is used to set the intensity and to direct a command to apply a pressure wave pulse to an animal to control undesired behavior. Hand held remote 180 transmits an RF signal 182 to receiver 184. Receiver 184 sends a receiver signal via line 186 to controller 188. Controller 188 receives the signal over line 186 and outputs a signal via line 190 representing the current flow duration corresponding to the intensity selected via the handheld remote 180. Current flow via line 190 is directed to pressure pulse generator 14 which in turn produces a corresponding pressure wave pulse 194 corresponding to the intensity selected.

In addition, a plurality of sensors may be operatively associated with controller 188. For example, a barking sensor 196 detects an animal's barking as an audio signal and directs a barking signal over line 202 to controller 188 which in turn administers a pressure pulse wave to the animal as a negative stimulus in response to the barking animal.

In addition, animal control device 10 may be sensitive to a wire 206 or a boundary transmitter (not shown) present within an area which is used to confine an animal. For example, if the animal were to stray outside a selected area, or approach a buried wire 206, receiver 184 directs a signal over line 186 to controller 188 which in turn initiates a pressure pulse wave by pressure wave generator 70.

Alternatively, a boundary transmitter (not shown) could be disposed inside an area in which the animal is prohibited. When the animal enters the prohibited area, receiver 184 receives the transmitted signal and a pressure pulse wave is generated as a negative stimulus to the animal. Consequently, the animal's improper behavior of entering a restricted area is deterred. Thus, an animal's behavior may be monitored and controlled without human monitoring.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A collar mounted animal control device for controlling the behavior of an animal, comprising:

a pressure pulse generator carried by the collar, said pressure pulse generator including a probe adapted to mechanically contact and generate a mechanical pressure pulse against the skin of the animal, said probe includes a tip which selectively and intermittently extends from said probe, said pressure pulse generator includes a pneumatic actuator associated with said tip for causing said intermittent extension of said tip; and a controller coupled with said pressure pulse generator for controlling selective application of the mechanical pressure pulse, said controller controlling operation of said pneumatic actuator.

2. The animal control device of claim 1, wherein said pneumatic actuator includes an impactor slidably disposed within a guide tube, said tip being disposed at an end of said guide tube, said impactor impinging upon said tip to cause said intermittent extension of said tip.

3. The animal control device of claim 2, further comprising a vent hole to ambient, said vent hole being in communication with said guide tube adjacent said end of said guide tube.

4. The animal control device of claim 2, further comprising a spring biasing said tip to a retracted position.

5. The animal control device of claim 1, further comprising an air source and a valve operatively coupling said air source with said pneumatic actuator.

6. The animal control device of claim 5, wherein said valve comprises a solenoid valve.

7. The animal control device of claim 1, further comprising a sensor to detect noise from said animal.

8. The animal control device of claim 7, wherein said animal is a dog and said sensor monitors barking by said dog.

9. The animal control device of claim 8, wherein a barking signal is generated by said sensor, said barking signal being directed to said controller.

10. The animal control device of claim 1, further comprising a receiver operatively associated with said controller.

11. The animal control device of claim 10, further comprising a transmitter operatively associated with said receiver.

12. The animal control device of claim 11, wherein said transmitter is a handheld remote device.

13. The animal control device of claim 11, wherein said transmitter includes a buried wire.

* * * * *

UNITED STATES PATENT AND TRADEMARK OFFICE
CERTIFICATE OF CORRECTION

PATENT NO. : 6,360,697 B1 Page 1 of 1
DATED : March 26, 2002
INVENTOR(S) : Matthew R. Williams et al.

It is certified that error appears in the above-identified patent and that said Letters Patent is hereby corrected as shown below:

Column 2,
Line 55, after "tip" insert -- 20 -- therefor.

Signed and Sealed this

Twelfth Day of August, 2003

JAMES E. ROGAN
*Director of the United States Patent and Trademark Office*